Sept. 20, 1960   A. L. LEE   2,953,212
MINE HAULAGE VEHICLE
Filed June 12, 1956   3 Sheets-Sheet 2
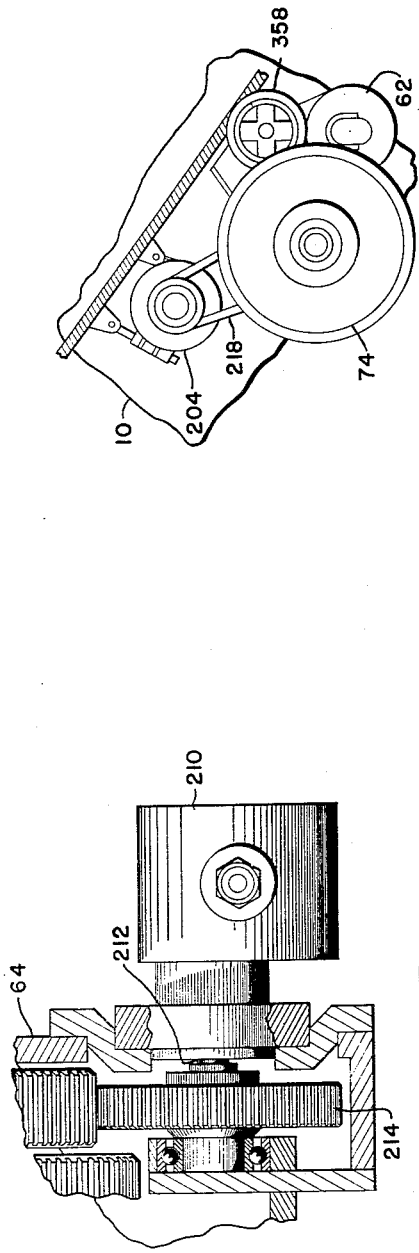
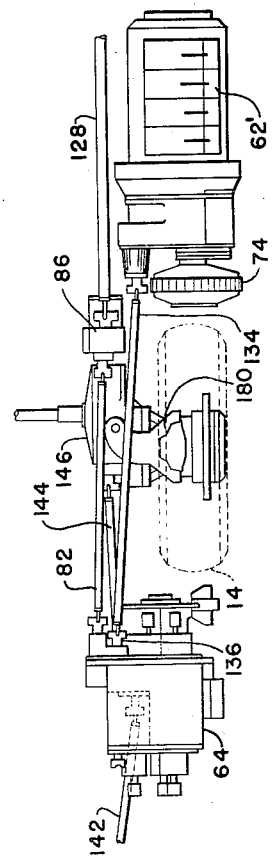
INVENTOR.
ARTHUR L. LEE
BY
*Stanley J. Price*
HIS ATTORNEY

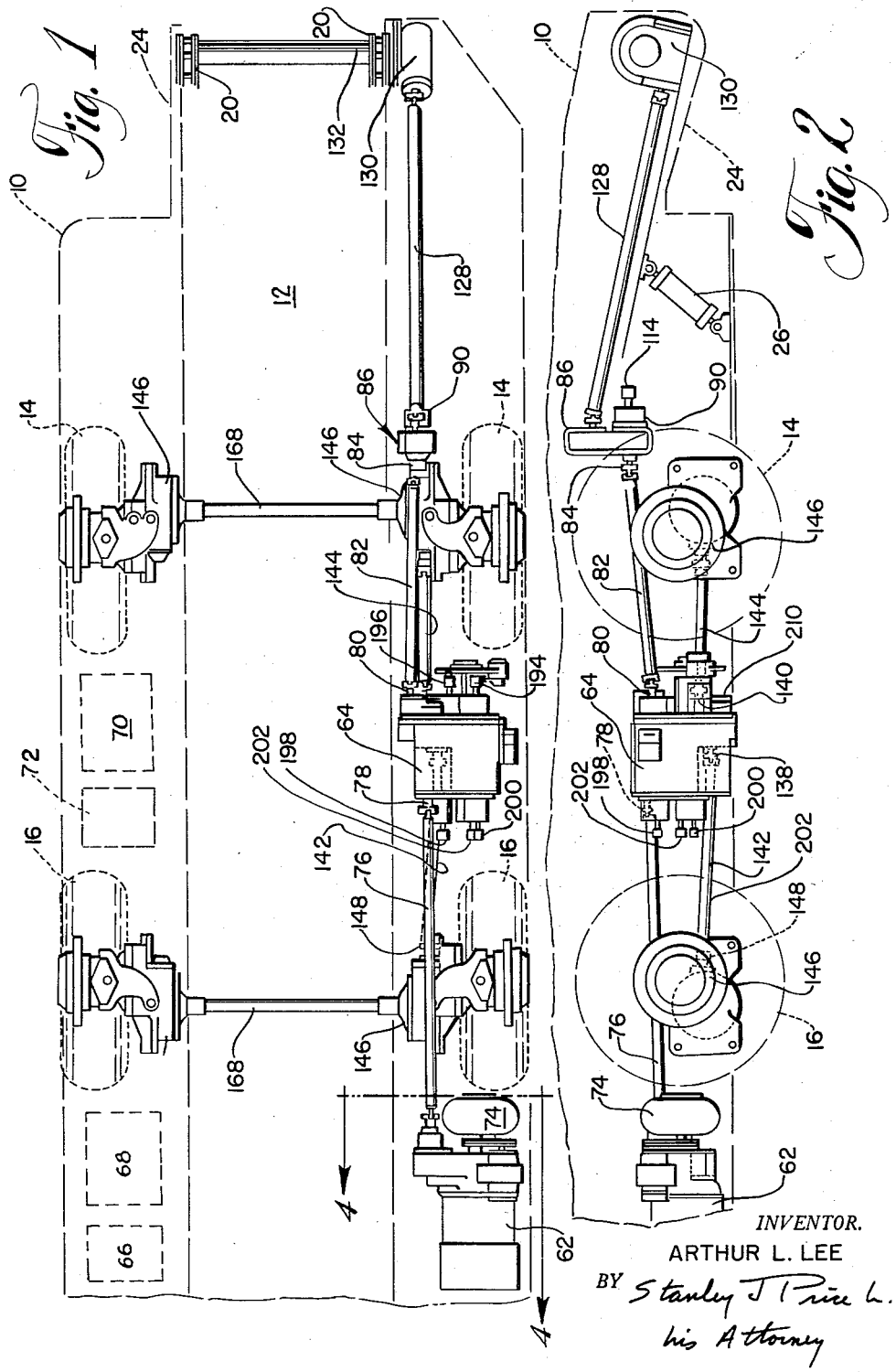

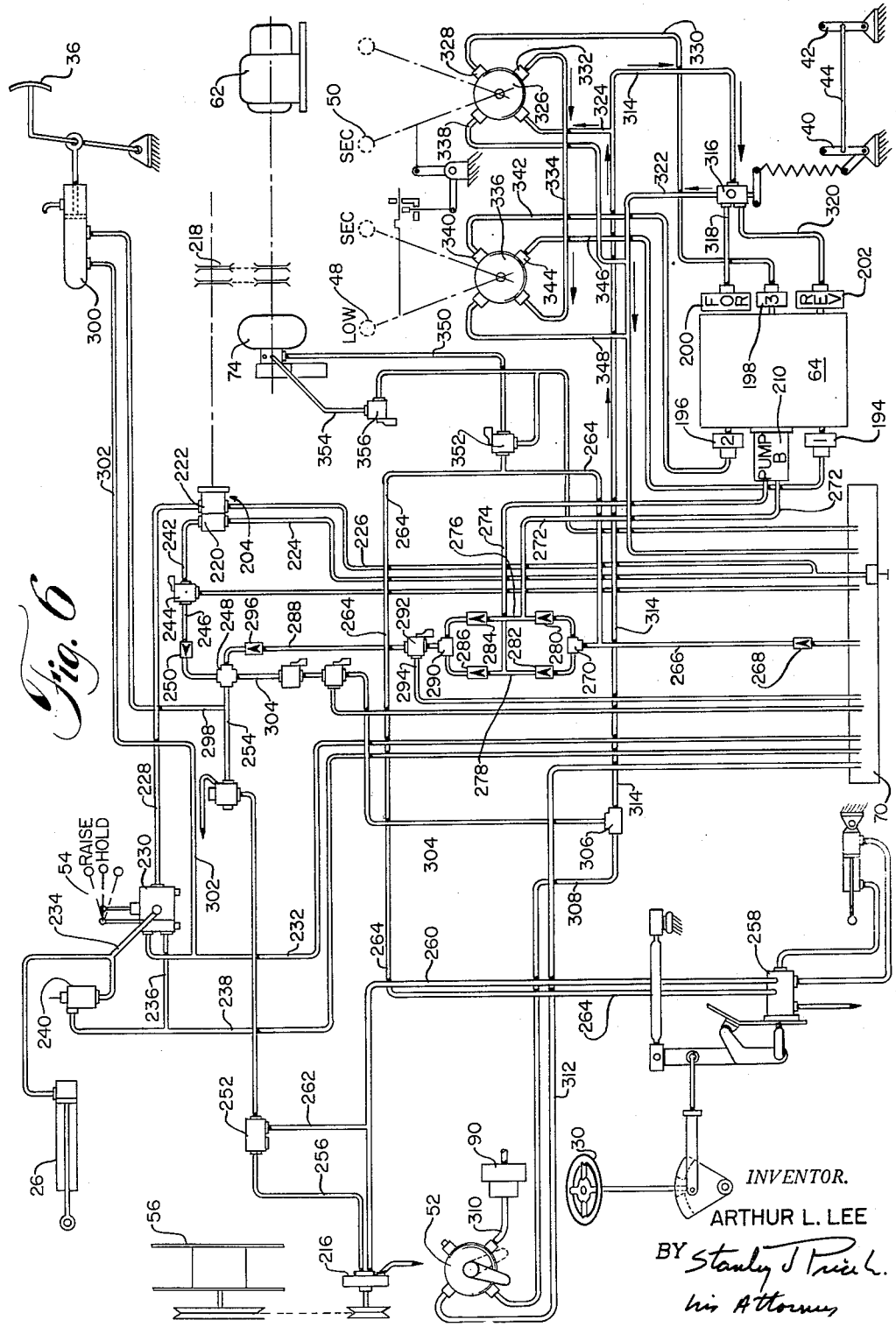

United States Patent Office 2,953,212
Patented Sept. 20, 1960

2,953,212

MINE HAULAGE VEHICLE

Arthur L. Lee, Columbus, Ohio, assignor to Consolidation Coal Company, Pittsburgh, Pa., a corporation of Pennsylvania Filed June 12, 1956, Ser. No. 590,963

10 Claims. (Cl. 180—44)

This invention relates to an automotive vehicle and more particularly to a hydraulic system for an automotive vehicle.

The present application is a continuation-in-part of my copending application Serial Number 244,549, now Patent No. 2,754,015, filed August 31, 1951, and assigned to the assignee of the present invention.

An object of this invention is to provide an improved vehicle having certain of its elements operated by fluid under pressure and having novel means associated therewith for generating said fluid pressure.

A further object is to provide improved liquid pressure generating means whereby a relatively small volume of liquid may be provided when the vehicle is stationary and a supplemental supply of liquid under pressure is made available when the vehicle is traveling and the liquid pressure demands are relatively high, thereby eliminating the need of by-passing a relatively large volume of liquid with its inherent power losses while the vehicle is stationary and when only a relatively small volume of liquid pressure is needed.

Another object is to provide a liquid control system arranged to energize several components simultaneously without a substantial liquid pressure loss.

A still further object is to provide a novel means to dissipate the heat generated by the operation of the torque converter.

These and other objects and advantages of the invention will, however, hereinafter more fully appear.

In the accompanying drawings there is shown for purposes of illustration one form which the invention may assume in practice.

In the drawings:

Figure 1 is a schematic view with the vehicle body in outline and showing portions of the driving means for the traction wheels and the conveyor and various control components.

Figure 2 is a schematic view in side elevation similar to Figure 1.

Figure 3 is an enlarged detail section taken through the auxiliary pump driven by a component of the vehicle transmission.

Figure 4 is a transverse vertical section taken on the line 4—4 of Figure 1 illustrating a portion of the drive means.

Figure 5 is a fragmentary view of a portion of the structure shown in Figure 1 illustrating use of an alternative prime mover and the connections therefor.

Figure 6 is a detailed diagrammatic view illustrating a hydraulic control system adapted to be used with the vehicle.

The several features of the invention as shown in the drawings are embodied in a mine haulage vehicle of the kind commonly known as a "shuttle car" especially designed for use in transferring loose material in underground mines, and while such features are especially adapted to use with such a vehicle they are also adapted to be used with automotive vehicles of other types.

Reference may be made to U.S. Patent #2,754,015 for a complete description of the vehicle construction.

The mine haulage vehicle disclosed herein generally comprises a body portion 10 having a material-receiving compartment 12. The body portion 10 is mounted on pairs of front and rear wheels 14 and 16 respectively. The front wheels 14 and the rear wheels 16 are both traction and steering wheels. The material-receiving compartment 12 extends longitudinally between front and rear wheels 14 and 16 in the manner shown in Figure 1. Extending along the bottom of the material-receiving compartment 12 is a conventional endless flight conveyor having parallel endless side chains 20 suitably guided within guideways along the material-receiving compartment 12. Cross flights are secured to the endless side chains 20 and extend transversely to the material-receiving compartment 12. Upon movement of the side chains 20 the cross flights convey the material within the material-receiving compartment 12 in a longitudinal direction along the material-receiving compartment bottom. The endless flight conveyor is provided with a tiltable end frame portion 24 which is adapted to pivot and vary the height of the discharge end of the endless flight conveyor. As shown diagrammatically in Figure 2 the tiltable end frame 24 may be moved in a vertical plane by means of the hydraulic actuator 26.

There is illustrated in Figure 1 at one end of the body portion 10 an electric motor 62 which may be either of the A.C. or D.C. type. Arranged at the same side of the body portion 10 as the electric motor 62, between the front and rear wheels 14 and 16, is a selective multi-speed transmission 64. Located at the opposite side of the body from the electric motor 62 is a storage battery 66 and control apparatus 68. Arranged between the front and rear wheels 14 and 16 on the same side of the body portion 10 as the storage battery 66 there is positioned a liquid tank 70 and the control valve apparatus 72 which is associated with the multi-speed transmission 64 and the hydraulic control system which will be described in detail later. The tank 70 and the control apparatus 72 are indicated diagrammatically in Figure 1.

Now referring to the conveyor and wheel drive of the vehicle as shown in Figures 1 and 2 it will be noted that the motor 62 is connected through a torque converter or fluid clutch 74 to a universal shafting 76 extending longitudinally within the body portion 10 at one side of the material-receiving compartment 12. The shafting 76 is connected at the other side to the input shaft 78 of the selective multi-speed transmission 64. The output shaft 80 from the transmission 64 is connected by universal shafting 82 to a shaft 84. The shaft 84 forms a part of the gear reducer 86 which is mounted on the same side of the body portion 10 as the multi-speed transmission 64.

The speed reducer 86 is connected by universal drive shafting 128 to a conventional speed reducer 130 (Figure 2). The output shaft of the speed reducer 130 drives a cross shaft 132 suitably journaled within the tiltable end frame or boom 24. The cross shaft 132 has chain sprockets suitably secured thereto which are adapted to engage and drive the endless side chains 20 and thereby drive the endless conveyor. With the universal shafting 128 the haulage vehicle end frame or boom 24 may be adjusted while the endless flight conveyor is energized and moving. This feature increases the efficiency of the haulage vehicle since the operator can now adjust the end frame or boom 24 as he approaches the discharging facilities. With this type of arrangement it is now possible for the operator to change the elevation of the end frame or boom 24 while the load of material carried in the material-receiving compartment 12 is being discharged therefrom by means of the endless flight conveyor thereby either evenly spreading the material or distributing the material over a given area.

In Figure 5 there is shown an internal combustion engine designated as 62' which is an alternative power source that may be used instead of the electric motor 62. The internal combustion engine 62' is connected by universal shafting 134 to another input shaft 136 on the selective multi-speed transmission 64. When the internal combustion engine 62' is connected to the transmission 64 the prime mover 62 is removed from the vehicle.

The selective multi-speed transmission 64 has a pair of terminal elements which drive the output shafts 138 and 140 (Figure 2). The output shafts 138 and 140 are in turn connected by oppositely extending universal drive shaftings 142 and 144 respectively to similar gear housings 146 arranged at one side of the vehicle body portion 10 (Figure 1). These gear housings 146 are rigidly secured to the adjacent side of the vehicle body portion 10 and include gearing connecting drive shaftings 142 and 144 with respective wheels 14 and 16 on the same side of the vehicle as transmission 64. Similar gear housings 146 are secured to the opposite sides of the vehicle 10 and include gearing which is connected by means of transverse shafts 168 to the gearing within the gear housings 146 on the opposite side of the vehicle in a manner that the pairs of front wheels 14 and rear wheels 16 may be concurrently driven and turned horizontally in unison about their swivel mountings to effect both propulsion and steering of the vehicle. The wheels may also be driven selectively at different predetermined speeds and in either direction at any speed through the selective multi-speed transmission 64 while the electric motor 62 operates at a constant speed. Of course, when an A.C. motor or Diesel engine is employed a variable speed drive may also be effected by conventional appropriate control of the motor or engine as desired. It will be noted that the selective transmission 64 is arranged in a relatively low position on the vehicle body down between the front and rear wheels at one side of the body, in such manner as to provide direct drive with the wheels as well as to provide an extremely compact arrangement.

As shown in Figure 6 the selective multi-speed transmission 64 includes selective speed controlling clutches 194, 196 and 198. Clutch 194 is the low speed clutch, clutch 196 the intermediate speed clutch and clutch 198 the high speed clutch. The multi-speed transmission 64 also includes a forward drive clutch 200 and a reverse drive clutch 202. These clutches are similar to the various change speed clutches.

As shown diagrammatically in Figure 6 the motor 62 by means of a belt and pulley arrangement 218 drives the pump 204. The pump 204 is in effect a double pump having two outlets 220 and 222. The pump 204 is capable, for example, of delivering 4 gal. per minute through outlet 220 and 8 gal. per minute through outlet 222. The pump 204 has its two suction sides connected by conduits 224 and 226 to the tank or reservoir 70. The high pressure outlet 222 is connected by a conduit 228 to an end frame or boom positioning valve 230 which is part of the boom control indicated by the numeral 54. A return or by-pass conduit 232 connects the positioning valve 230 with the tank 70. A pressure conduit 234 connects the positioning valve 230 with the end frame hydraulic actuator 26. A conduit 236 connects the positioning valve 230 with the second return conduit 238 and relief valve 240 interconnects the pressure conduit 234 with the return conduit 238. With this arrangement the boom or end frame 24 may be either raised, lowered or held in a given position. It should be noted with this arrangement that the hydraulic pressure required to control the boom or end frame 24 is entirely independent of the remaining hydraulic control system. Thus, the high pressures required to operate the boom or end frame 24 will not scavenge pressure from the remainder of the system, thus making the remainder of the system inoperable while the boom 24 is being operated. This arrangement also eliminates the usual large volume pump and the consequential large volume of high pressure by-passed fluid during periods when the boom 24 is not being adjusted.

The low pressure outlet 220 of pump 204 is connected by means of conduit 242 to a relief valve 244 which limits the pressure from the pump 204 to a given pressure such as 1,200 pounds p.s.i. A conduit 246 connects the outlet side of the relief valve 244 with a four-way connection 248. A check valve 250 is positioned in the conduit 246 to limit flow of the fluid to one direction as indicated. The four-way connection 248 is connected to the cable reel drive regulating valve 252 by means of a conduit 254 and the cable reel regulating valve 252 in turn is connected to a cable reel motor 216 by means of conduit 256. The cable reel motor 216 propels the cable reel generally designated by the numeral 56 in the desired direction. The outlet side of the cable reel motor 216 is connected to the inlet side of a power steering valve 258 by means of a conduit 260. A branch conduit 262 interconnects the by-pass or outlet side of the cable reel valve 252 with the conduit 260. The outlet or return side of the steering valve 258 is connected by a conduit 264 to a conduit 266 between the check valve 268 and a T connection 270.

The transmission 64 has a pump 210 (pump B) operably connected thereto so that the pump may deliver liquid under pressure when the transmission 64 is in operation. The pump 210 has a pair of conduits 272 and 274 connected to conduits 276 and 278. Both the conduits 276 and 278 are connected by means of the T connection 270 to the conduit 266 which in turn extends into the tank or reservoir 70. Since the multi-speed transmission 64 is reversible the pump 210 is also reversible and operable in two directions. Depending on the direction of operation either the conduit 272 or 274 is the suction or low pressure conduit. Liquid is withdrawn from the reservoir 70 through the conduit 266 beyond the check valve 268 and enters the T connection 270. The liquid then passes through either the conduits 276 and 272 or 278 and 274 to the pump 210. Two pairs of check valves 280—282 and 284—286 regulate the flow direction of the liquid through the conduits 276 and 278.

A conduit 288 is connected to the conduits 276 and 278 at a T connection 290. A relief valve 292 is positioned in the conduit 288 to limit pressure therethrough and has a return conduit 294 connected thereto which returns by-passed liquid to the tank 70. The conduit 288 is connected at its other end to the four-way connection 248 with a check valve 296 positioned in the conduit 288 to limit direction of flow therein. A branch conduit 298 is connected to the conduit 254 adjacent the four-way connection 248 and supplies fluid under pressure to a brake valve 300 which aids the operator in brake operation. The return conduit 302 interconnects the brake valve 300 with the return conduit 232.

Liquid under pressure from both pumps 204 and 210 passes from the four-way connection 248 through conduit 304 to T connection 306. A conduit 308 interconnects one outlet of the T connection 306 to the inlet of the conveyor actuator valve indicated by the numeral 52 which is interconnected with the conveyor clutch indicated by the numeral 90 by means of the conduit 310. A return conduit 312 interconnects the conveyor actuator valve 52 with the tank 70.

A conduit 314 is secured to the other end of the T connection 306 and conveys liquid under pressure to a forward and reverse valve 316. Conduit 318 connects the valve 316 to the forward clutch actuator 200 and conduit 320 connects valve 316 to the reverse clutch actuator 202. A return conduit 322 interconnects the forward and reverse valve 316 with the tank or reservoir 70.

The conduit 314 has a branch conduit 324 which is connected to a valve 326 which is part of the change speed clutch actuator indicated by the numeral 50. The valve 326 has a pressure outlet 328 which is connected by a conduit 330 to the actuator for the high gear clutch 198. The valve 326 has a second pressure outlet 332 which is connected by means of a conduit 334 to the inlet of a second valve 336. A return conduit 338 connects the valve 326 with the return conduit 322. Thus, depending upon the position of the valve 326 liquid under pressure will be delivered either through conduit 330 to clutch mechanism 198 or through conduit 334 to valve 336. The valve 336 is a part of another change speed clutch actuator designated by the numeral 48 and has a pressure outlet 340 which is connected by means of a conduit 342 to the actuator for the intermediate clutch 196. A second pressure outlet 344 is connected by means of a conduit 346 to the actuator for the low gear clutch 194. The valve 336 has a return conduit 348 which is connected to the main line return conduit 322.

The conduit 264 leading from the power steering valve 258 has a branch conduit 350 connected thereto. The branch conduit 350 is connected at its other end to the fluid coupling or torque converter 74. A relief valve 352 is positioned in the conduit 350 to regulate the pressure of the liquid conveyed to the torque converter 74. A return conduit 354 connects the torque converter 74 with the tank or reservoir 70. A relief valve 356 regulates the pressure within the torque converter 74. With this arrangement liquid is continually pumped through the torque converter 74 and cools the same. The remainder of the hydraulic system functions as a heat exchanger thereby dissipating the heat generated by the torque converter 74.

One arrangement for driving the fluid pump 204 is shown in Figure 4. The motor 62 is interconnected by means of the belt and pulley arrangement 218 to the pump 204. In addition, the motor 62 through a suitable connecting means drives an electric generator 358 (Figure 4). The generator is connected by suitable wiring to the storage battery 66 whereby charging of the battery may be effected.

A suitable arrangement for driving the pump 210 is shown in Figure 3 wherein a pump shaft 212 is connected by means of spur gear 214 to an active gear of the transmission 64.

In Figure 6 the various transmission clutches 194, 196, 198, 200 and 202; the conveyor clutch 90; the power steering mechanism 258; power brake mechanism 300; cable reel winding mechanism 216; and the torque converter 74 are connected in series to a common conduit so that either pump 210 or pump 204 can supply fluid under pressure to operate these fluid actuated members.

When the vehicle is not in motion and the motor 62 is energized the pump 204 through the belt and pulley arrangement 218 pumps fluid under pressure through the conduits 242, 246, 254 and 304 to the above enumerated fluid pressure operated members; and, for example, supplies fluid to the cable reel motor 216 to maintain the power cable in tension on the cable reel 56. The excess fluid from pump 204 passes through T connection 270, branch conduits 276 and 278 and then through the remainder of the system to the reservoir. Thus, pump 204 alone pressurizes the entire hydraulic system.

As the vehicle moves, pump 210, which is interconnected with the output side of the transmission 64, pumps fluid in proportion to the velocity of the vehicle into the common conduit which connects the above named fluid actuated members. Fluid is provided for pump 210 from the reservoir 70, the conduit 266 and either conduit 276 or 278 depending on the direction of travel of the vehicle. Also, excess fluid from pump 204 enters the conduit 266 from the conduit 264 and conveys additional fluid to the pump 210. It should be noted that the output of pump 210 is proportional to the vehicle speed. Thus, as the vehicle speed increases and the demand for fluid in the system increases, the output of pump 210 also increases. Therefore, with the above described arrangement, an adequate supply of fluid under pressure is maintained in the system when required without the necessity of a large volume pump and unnecessary fluid by-passing.

This invention also includes a safety means for supplying fluid to the hydraulic system while the vehicle is moving although the prime mover is deenergized. This arrangement now makes it possible for the operator to downshift the transmission, negotiate sharp corners in the mine passageways with the assistance of power steering and apply braking power with the assistance of power brakes after there has been a power failure and the prime mover has been deenergized. For example, if the vehicle were traveling downgrade, or at a relatively high rate of speed and there was a sudden power failure, the inertia of the vehicle caused by its weight would propel the vehicle a given distance even with the loss of power to the prime mover. During this period when the vehicle is literally coasting to a stop the operator needs power steering, power brakes and a means to down-shift the transmission. The pump 210 which is directly connected to the transmission 64 and in turn to the propelling means will remain active and supply fluid under pressure to the various hydraulically operated mechanisms. Thus, when the motor 62 is deenergized pump 204 likewise stops operation and without pump 210 the entire hydraulic system would be deenergized. However, since the output of pump 210 is dependent on vehicle movement, sufficient fluid is supplied to the hydraulic system to permit the operator to retain control of the vehicle after the prime mover is deenergized.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a vehicle of the character disclosed, a prime mover, a multi-speed transmission having a plurality of speeds in both forward and reverse direction, means connecting said prime mover to the input side of said transmission, propelling means for said vehicle connected to the output side of said transmission, said transmission including change speed and directional fluid pressure operated clutches, a fluid pump connected to and driven by said transmission, said fluid pump including means to supply fluid under pressure in proportion to the output speed of said transmission in either the forward or reverse direction, first valve means to control said directional clutches, second valve means to control said change speed clutches, and pressure conduit means connecting the output side of said pump with said first and second valve means so that both said directional clutches and said change speed clutches may be actuated upon movement of said propelling means in both forward and reverse direction.

2. In a vehicle of the character disclosed, a prime mover, a multi-speed transmission having a plurality of speeds in both forward and reverse direction, said transmission driven by said prime mover, propelling means for said vehicle connected to the output side of said transmission, said transmission including a plurality of change speed fluid pressure actuated clutches and a pair of directional fluid pressure actuated clutches, a pump driven by said transmission, said pump including means to supply fluid under pressure in proportion to the output speed of said transmission in both forward and reverse direction, directional valve control means having a pressure inlet and a pair of pressure outlets, change speed valve control means having a pressure inlet and a plurality of pressure outlets, pressure conduit means connecting said pump to the pressure inlets of said directional valve control means and said change speed valve control means, conduit means connecting one of said directional valve control means pressure outlets to one of said directional clutches and the other of said pressure outlets to the remaining directional clutch, and conduit means connecting each of the change speed valve control means pressure outlets to a corresponding change speed clutch, and manually operable means to control said directional valve control means and said change speed valve control means.

3. In a vehicle of the character disclosed, a prime mover, a multi-speed forward and reverse transmission, fluid coupling means connecting said prime mover to the input side of said transmission, said transmission having a plurality of fluid pressure actuated change speed clutches and a pair of directional fluid pressure operated clutches, propelling means for said vehicle connected to the output side of said transmission, a first pump connected to and driven by said prime mover, a second pump connected to and driven by said transmission in a manner that said second pump supplies fluid under pressure in proportion to the output speed of said transmission, a first valve member having a pressure inlet, a first pressure outlet and a second pressure outlet, a second valve member having a pressure inlet, a first pressure outlet and a second pressure outlet, a third valve having a pressure inlet, a first pressure outlet and a second pressure outlet; pressure conduit means connecting both of said pumps to said first and second valve member pressure inlets, conduit means connecting said first valve member first pressure outlet to one of said directional clutches and said second pressure outlet to the other of said directional clutches, manual control means to control the outlet of fluid through said last named pressure outlets whereby directional control of said transmission may be maintained, conduit means connecting one of said pressure outlets of said second valve member with the pressure inlet of said third valve member, conduit means connecting the other of said second valve member pressure outlets with a one of said speed controlling clutches, manual control means operable to control the outlet of fluid through said second named valve pressure outlets to either supply fluid under pressure to said third valve member or actuate one of said speed controlling clutches, conduit means connecting said third valve pressure outlets to the other pair of speed controlling clutches, and manual control means operable to control the outlet of fluid through said third valve pressure outlets to actuate either of said last named speed controlling clutches.

4. In a vehicle of the character disclosed the combination comprising a prime mover, propelling means for said vehicle, means connecting said prime mover to said propelling means, a first pump connected to and operable with said prime mover, a second pump connected to and driven by said propelling means in a manner that said second pump supplies fluid under pressure in proportion to the speed of said propelling means, a fluid reservoir, a plurality of fluid pressure actuated members, a first conduit connecting the inlet of said second pump with said reservoir, valve means in said first conduit limiting flow of fluid in a direction from said reservoir to said second pump, a second conduit connecting the inlet of said first pump with said reservoir, a third conduit connecting the outlet of said first pump with said fluid pressure actuated members and said first conduit between said valve means and the inlet of said second pump so that fluid under pressure from said first pump enters the inlet of said second pump when said first pump is in operation, and a fourth conduit connecting the outlet of said second pump with said third conduit so that fluid under pressure may be maintained in said third conduit to operate said fluid pressure actuated members upon operation of either said prime mover or said propelling means.

5. In a vehicle of the character disclosed the combination comprising a prime mover, a forward and reverse transmission, fluid coupling means connecting said prime mover to the input side of said transmission, propelling means for said vehicle operatively connected to the output side of said transmission, a first fluid pump connected to and operable with said prime mover, a second pump connected to and driven by the output side of said transmission in a manner that said second pump supplies fluid under pressure in proportion to the output speed of said transmission, said second pump being operable to pump fluid under pressure irrespective of the direction of movement of said vehicle, said second pump including a pair of fluid openings, said first fluid opening adapted to serve as a fluid inlet port when said vehicle is moving in a forward direction and a fluid outlet port when said vehicle is moving in a reverse direction, said second fluid opening adapted to serve as a fluid outlet port when said vehicle is moving in a forward direction and as a fluid inlet port when said vehicle is moving in a reverse direction, a fluid reservoir, a plurality of fluid pressure actuated members, a pair of conduits each having a pair of check valves therein operable to control the direction of flow through said conduits, a first conduit connecting said second pump first fluid opening with one of said pair of conduits between said flow controlling valves, a second conduit connecting said second pump second fluid opening and the other of said pair of conduits between said flow controlling valves, a third conduit connecting said reservoir with said pair of conduits so that said second pump may be supplied with fluid from said reservoir irrespective of direction of vehicle movement, said third conduit having a check valve therein controlling the direction of flow from said reservoir to said pair of conduits, a fourth conduit connecting the inlet of said first pump with said reservoir, a fifth conduit connecting the outlet of said first pump with said pressure actuated members and said third conduit between said check valve and said pair of conduits so that fluid under pressure from said first pump enters the inlet of said second pump when said first pump is in operation, and a sixth conduit connecting said pair of conduits with said fifth conduit so that fluid under pressure may be maintained in said fourth conduit to operate said fluid pressure actuated members upon operation of either said prime mover or said transmission.

6. In a vehicle of the character disclosed, the combination comprising a fluid pump, a plurality of fluid pressure actuated members arranged in spaced relation to said pump and to each other on said vehicle, fluid circuit means operably connecting said pump and said fluid pressure actuated members, a fluid coupling having a fluid inlet port and a fluid outlet port, said fluid coupling arranged in spaced relation to said pressure actuated members, said fluid inlet and outlet ports being connected to said fluid circuit means, said fluid circuit means including elongated conduit sections connecting in series said pump, said pressure actuated members and said fluid coupling inlet and outlet ports, said circuit means elongated conduit sections being of substantial length, heat dissipating means consisting essentially of said fluid circuit means and said pressure actuated members, said fluid circuit means so constructed and arranged that said fluid continuously circulates through said fluid coupling and removes excessive heat therefrom and said fluid continuously circulates through said heat dissipating means and dissipates said heat so removed, and means associated with said fluid coupling to maintain a predetermined fluid pressure in said fluid coupling.

7. In a vehicle of the character disclosed, the combination comprising a prime mover having a fluid coupling associated therewith, said fluid coupling having an inlet port and an outlet port, propelling means for said vehicle operably connected to said prime mover, a pump arranged in spaced relation to said fluid coupling on said vehicle, a fluid reservoir arranged in spaced relation to said pump and said fluid coupling, a plurality of fluid pressure actuated members arranged in spaced relation to said pump, said reservoir, said fluid coupling and each other, fluid circuit means comprising sections of elongated pressure conduit connecting said pump, said fluid pressure actuated members, and said coupling inlet port in series, and sections of elongated return conduit connecting said coupling outlet port and said reservoir, pressure operated valve means associated with said fluid coupling to maintain a predetermined pressure therein, said conduit sections being of substantial length, heat dissipating means consisting essentially of said fluid circuit means, said fluid pressure actuated members, and said reservoir, said fluid pressure means so constructed and arranged that said fluid continuously circulates through said fluid coupling and removes excessive heat therefrom and said fluid continuously circulates through said heat dissipating means and dissipates said heat so removed.

8. In a vehicle of the character disclosed, the combination comprising a prime mover, means for propelling said vehicle selectively forwardly and rearwardly, fluid coupling means connecting said prime mover to said propelling means, a first pump connected to and operable with said prime mover, a second pump connected to and driven by said propelling means when said propelling means is driving said vehicle either forwardly or rearwardly in a manner that said second pump supplies fluid under pressure in proportion to the speed of said propelling means, a plurality of fluid pressure actuated members arranged in spaced relation to said first and second pumps and to each other on said vehicle, fluid circuit means connecting both of said pumps to said fluid pressure actuated members so that fluid under pressure may be maintained in said fluid circuit means upon operation of either said prime mover or said propelling means, said fluid coupling means connected to said fluid circuit means, said fluid circuit means being of substantial length, heat dissipating means consisting essentially of said fluid circuit means and said pressure actuated members, said fluid circuit means so constructed and arranged that said fluid continuously circulates through said fluid coupling and removes excessive heat therefrom and said fluid continuously circulates through said heat dissipating means and dissipates said heat so removed, and means associated with said fluid coupling to maintain a predetermined fluid pressure in said fluid coupling.

9. In a vehicle of the character disclosed, the combination comprising a prime mover, a forward and reverse transmission, fluid coupling means connecting said prime mover to the input side of said transmission, propelling means for said vehicle operatively connected to the output side of said transmission, a first fluid pump connected to and operable with said prime mover, a second pump connected to and driven by the output side of said transmission in a manner that said second pump supplies fluid under pressure in proportion to the output speed of said transmission, said second pump being operable to pump fluid under pressure irrespective of the direction of movement of said vehicle, said second pump including a pair of fluid openings, said first fluid opening adapted to serve as a fluid inlet port when said vehicle is moving in a forward direction and a fluid outlet port when said vehicle is moving in a reverse direction, said second fluid opening adapted to serve as a fluid outlet port when said vehicle is moving in a forward direction and as a fluid inlet port when said vehicle is moving in a reverse direction, a fluid reservoir, a plurality of fluid pressure actuated members, a pair of conduits each having a pair of check valves therein operable to control the direction of flow through said conduits, a first conduit connecting said second pump first fluid opening with one of said pair of conduits between said flow controlling valves, a second conduit connecting said second pump second fluid opening and the other of said pair of conduits between said flow controlling valves, a third conduit connecting said reservoir with said pair of conduits so that said second pump may be supplied with fluid from said reservoir irrespective of direction of vehicle movement, said third conduit having a check valve therein controlling the direction of flow from said reservoir to said pair of conduits, a fourth conduit connecting the inlet of said first pump with said reservoir, a fifth conduit connecting the outlet of said first pump with said pressure actuated members and said third conduit between said check valve and said pair of conduits, and a sixth conduit connecting said pair of conduits with said fifth conduit so that fluid under pressure may be maintained in said fifth conduit to operate said fluid pressure actuated members upon operation of either said prime mover or said transmission.

10. In a vehicle of the character disclosed, a prime mover, propelling means for said vehicle, a pump connected to and driven by said propelling means and providing fluid under pressure upon movement of said propelling means in both forward and reverse direction, a fluid reservoir, a plurality of pressure actuated members, said pump having a pair of fluid openings, said first fluid opening adapted to serve as a fluid inlet port when said vehicle is moving in a forward direction and a fluid outlet port when said vehicle is moving in a reverse direction, said second fluid opening adapted to serve as a fluid outlet port when said vehicle is moving in a forward direction and as a fluid inlet port when said vehicle is moving in a reverse direction, a pair of conduits each having a pair of check valves therein operable to control direction of flow through said conduits, a first conduit connecting said pump first fluid opening with one of said pair of conduits between said flow controlling valves, a second conduit connecting said pump second fluid opening with the other of said pair of conduits between said flow controlling valves, a third conduit connecting said reservoir with said pair of conduits so that said pump may be supplied with fluid from said reservoir irrespective of the direction of vehicle movement, said third conduit having a check valve therein controlling the direction of flow from said reservoir to said pair of conduits, and a fourth conduit connecting said pair of conduits with said pressure actuated members so that said pump supplies fluid under pressure to said pressure actuated members upon movement of said vehicle in either forward or reverse direction.

References Cited in the file of this patent

UNITED STATES PATENTS

| | | |
|---|---|---|
| Re. 24,327 | Lee | July 11, 1957 |
| 2,642,168 | Black et al. | June 16, 1953 |
| 2,734,399 | Christenson | Feb. 14, 1956 |
| 2,736,412 | Livegey | Feb. 28, 1956 |
| 2,740,257 | Carnagua | Apr. 3, 1956 |